Patented Dec. 28, 1943

2,337,566

UNITED STATES PATENT OFFICE 2,337,566

ANTHRAQUINONE COMPOUNDS

James G. McNally and Joseph B. Dickey, Rochester, N. Y., assignors to Eastman Kodak Company, Rochester, N. Y., a corporation of New Jersey No Drawing. Application October 21, 1939, Serial No. 300,660

2 Claims. (Cl. 260—345)

This invention relates to the art of dyeing or coloring. More particularly, it relates to the preparation of anthraquinone compounds having an alkylene sulfonic acid group, other than methylene, attached through a nitrogen atom which is joined directly to the anthraquinone nucleus and to certain of said anthraquinone compounds, as new products. Depending upon their structure, the dye compounds of our invention are suitable for the dyeing or coloration of organic derivatives of cellulose, cotton, wool, rayon and natural silk. This application is a continuation in part of our application Serial No. 114,864, filed December 8, 1936, now Patent No. 2,188,369.

It is an object of our invention to provide a satisfactory process for the manufacture of the anthraquinone compounds of our invention. A further object is to provide a new class of anthraquinone compounds. Another object is to provide material made of or containing an organic derivative of cellulose colored with the anthraquinone compounds of our invention. Other objects will hereinafter appear.

While our invention relates broadly to the preparation of compounds having an alkylene sulfonic acid group, other than methylene, attached to the anthraquinone nucleus through a nitrogen atom which is joined directly to the anthraquinone nucleus, it relates more particularly to the preparation of those compounds corresponding to the general formula:

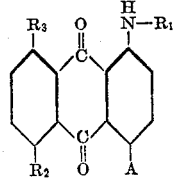

wherein $R_1$ represents an alkylene sulfonic acid group, other than methylene, A represents a hydroxy group, an alkoxy group, a halogen atom or a

group wherein X and Y represent hydrogen, an alkyl group, an aralkyl group, an aryl radical, a heterocyclic radical or a hydroaromatic radical and wherein, when X is hydrogen, Y may also be a hydroxy or an alkoxy group and $R_2$ and $R_3$ represent univalent non-metallic substituents other than a sulfonic acid group or a carboxylic acid group, such hydrogen, a hydroxy group, an alkoxy group, an amino group, an alkylamino group, a heterocyclic amino radical, a hydroaromatic amino radical and an arylamino group. It will be understood that X and Y may be the same or different substituents. Ordinarily, one of the members X and Y will be hydrogen. Similarly, $R_2$ may be the same substituent as $R_3$ or a different substituent.

The alkylene sulfonic acid group may be in its free acid form or in the form of a salt. Thus it may be in the form of a salt of an organic base such as ethanolamine, an alkali metal such as sodium or potassium, an alkaline earth metal such as calcium, a metal such as copper or of ammonium.

It will be understood that alkyl as used herein, unless otherwise indicated, includes not only unsubstituted alkyl groups such as a methyl group, an ethyl group, a propyl group or a butyl group but also substituted alkyl groups such as β-hydroxyethyl, β-hydroxypropyl, β,γ-dihydroxypropyl, γ-hydroxypropyl, β-methoxyethyl, β-ethoxyethyl, β-sulfoethyl, β-sulfopropyl, γ-sulfopropyl, Δ-sulfobutyl, or γ-sulfobutyl, for example. Illustrative of alkoxy may be mentioned methoxy, ethoxy, propoxy, β-methoxyethoxy and β-ethoxyethoxy, for example. Illustrative alkylene sulfonic acid groups, other than methylene, include, for example, $$-CH_2CH_2SO_3Na$$

$$-CH_2CHCH_3$$
$$\phantom{-CH_2CH}|$$
$$\phantom{-CH_2CH}SO_3Na$$

$$-CH_2CH_2CH_2SO_3NH_4$$

$$-CH_2CH_2CHCH_3$$
$$\phantom{-CH_2CH_2CH}|$$
$$\phantom{-CH_2CH_2CH}SO_3K$$

$$-CH_2CH_2CH_2CH_2SO_3H$$

$$-CH_2CHOHCH_2SO_3Na$$

and $$-CH_2CHCH_2CH_2CH_2CH_3$$
$$\phantom{-CH_2CH}|$$
$$\phantom{-CH_2CH}SO_3Na$$

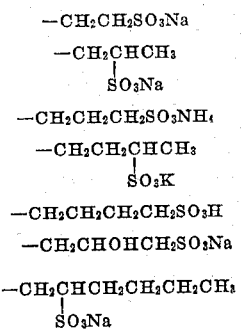

Illustrative of aralkylamino may be mentioned benzylamino and phenylethylamino. Similarly, illustrative of arylamino may be mentioned phenylamino and naphthylamino. Heterocyclic amino groups include, for example, the radicals of 2-aminopyridine, 3, 6 or 8-aminoquinoline, 1, 2 or 3-aminocarbazole, aminonaphthoquinolines, aminoacridines and aminoacridones.

The term hydroaromatic as used herein and in the claims, unless otherwise indicated, is intended to include cycloalkyl. Thus hydroaromatic amines include, for example, cyclohexylamine, cyclopentylamine, cyclobutylamine, dihydroaniline and 1,2,3,4-tetrahydro-α-naphthylamine.

The nuclear non-sulfonated anthraquinone compounds of our invention may be employed for the dyeing or coloration of organic derivatives of cellulose. Advantageously, when the compounds of our invention are to be employed for the coloration of organic derivatives of cellulose, they should contain neither a sulphonic acid group nor a carboxylic acid group in the anthraquinone nucleus. These nuclear non-sulfonated compounds likewise possess application for the coloration of wool and silk. The nuclear sulfonated compounds possess little or no utility for the coloration of organic derivatives of cellulose but may be employed for the coloration of wool, cotton, rayon and silk. The dyeings produced by the dye compounds of our invention are, in general, of good fastness to light and washing and range in shade from purple to blue green.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

The anthraquinone compounds to which we lay claim in this application are those having an alkylene sulfonic acid group, other than methylene, attached to the anthraquinone nucleus through a nitrogen atom which is an α-position on the anthraquinone nucleus and an organic radical selected from the group consisting of a heterocyclic and a hydroaromatic radical attached to the anthraquinone nucleus through a nitrogen atom which is in an α-position on the anthraquinone nucleus. Generally speaking, the groups just mentioned will be in para position to each other.

The alkylene sulfonic acid group can be advantageously introduced by reacting a leuco anthraquinone compound having a reactive substituent with a primary sulfonated alkylamine, other than methylamine, and oxidizing the leuco compound formed to obtain the desired non-leuco form. The condensation reaction just referred to can also be carried out in the presence of another amine such as methylamine, ethylamine, propylamine, butylamine, β-hydroxyethylamine, β-methoxyethylamine, cyclohexylamine, aniline and benzylamine. In this case, the leuco anthraquinone should contain at least two substituent groups capable of reaction with the amine reactants. Suitable leuco anthraquinone compounds which can be employed include, for example, diaminoanthrarufin, leuco quinizarin, leuco-1-amino-4-hydroxyanthraquinone, leuco-1,4-diaminoanthraquinone and leuco-1,4,5,8-tetrahydroxyanthraquinone. Preferably the primary sulfonated alkylamine is employed in the form of a salt such as that of an alkali metal or ammonium.

The preparation of anthraquinone derivatives containing more than one substituent can be carried out stepwise. Thus, 1-β-sulfoethylamino-4-methylaminoanthraquinone, for example, can be prepared by reacting leuco quinizarin with one equivalent of sodium taurinate and then with methylamine. The condensation reactions under discussion may be carried out in the presence of a diluent medium such as pyridine, propanol, butanol or isobutyl alcohol and the resulting leuco compounds oxidized in known fashion with an oxidizing agent such as air, nitrobenzene or sodium perborate. In some instances it may be desirable to carry out the oxidation treatment simultaneously with the formation of the leuco derivative and this may be done by passing air through the mixture during the period of formation of leuco derivative.

Anthraquinone compounds of our invention containing an alkylene sulfonic acid group attached to the anthraquinone nucleus through a nitrogen atom which is joined directly to the anthraquinone nucleus can be prepared in a variety of ways other than that just described. The choice of method to be employed will depend largely upon the particular compound to be prepared and the availability and cost of the reactants necessary for the preparation of the desired compound. These methods are indicated hereinafter in equation form. The letter R in each instance represents an anthraquinone nucleus. Similarly, the letter $x$ in each instance represents a whole number such as 1, 2, 3, 4 etc. Further, since the alkylene sulfonic acid group is normally in an α-position on the anthraquinone nucleus the reactive group shown attached to the anthraquinone nucleus designated R is ordinarily in an α-position. The anthraquinone nucleus R can, of course, contain substituents in addition to the one entering into reaction. These substituents can be introduced by the methods customarily employed for their introduction into an anthraquinone nucleus.

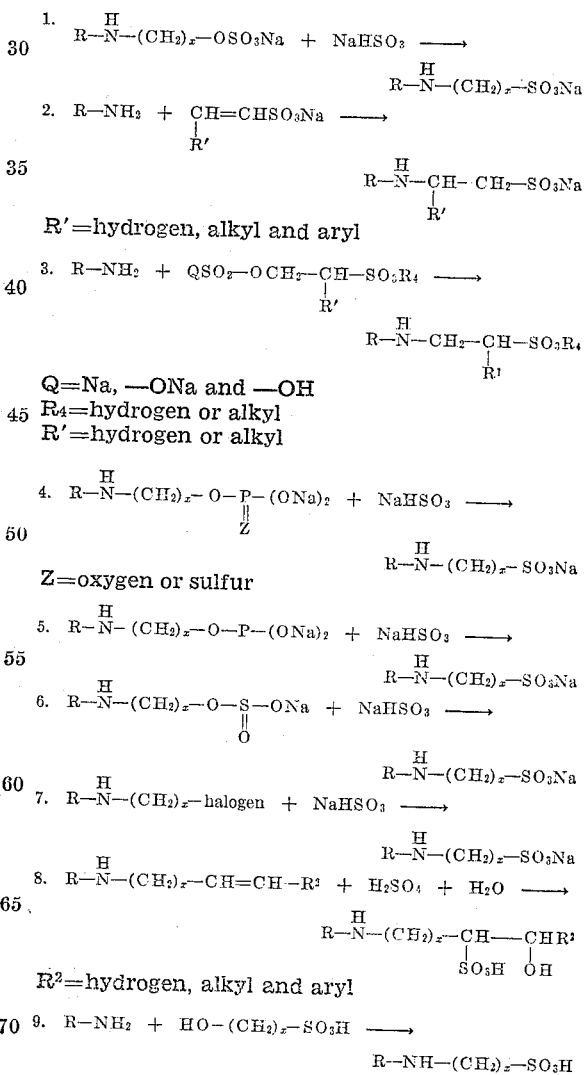

The following examples illustrate the preparation of the anthraquinone compounds of our invention:

EXAMPLE 1.—*Preparation of 1-sodium-β-sulfoethylamino-4-hydroxyanthraquinone*

2.4 grams of leuco quinizarin, 25 cc. of pyridine and a solution of 1.11 grams of taurine and 0.53 gram of anhydrous sodium carbonate in 15 cc. of hot water are boiled four hours. Air is passed into the hot solution which is allowed to evaporate somewhat. The violet solution resulting is then well cooled and the 1-sodium-β-sulfoethylamino-4-hydroxyanthraquinone recovered by filtration. The recovered compound may be purified by dissolving in hot water and filtering. The filtrate may be employed for dyeing or, if desired, it may be acidified and the dye compound recovered in the form of the free acid which may also be employed for direct dyeing from an aqueous dyebath.

EXAMPLE 2.—*Preparation of 1-sodium-β-sulfoethylamino - 4 - sodium-β-sulfoethylaminoanthraquinone*

2.4 grams of leuco quinizarin, 25 cc. of pyridine and a solution of 3.52 grams of taurine and 1.5 grams of anhydrous sodium carbonate in 15 cc. of hot water are refluxed for four hours and the resulting solution evaporated to dryness on a steam bath while passing in a brisk stream of air. The 1,4-di-(sodium-β-sulfoethylamino)-anthraquinone is obtained as a blue-black solid with a red metallic luster. It dissolves readily in cold water. The free acid formed may be easily obtained upon the addition of a slight excess of mineral acid to its solution in cold water.

EXAMPLE 3.—*Preparation of 1-sodium-β-sulfoethylamino - 4 - β - hydroxyethylaminoanthraquinone*

The leuco form of 1-sodium-β-sulfoethylamino-4-hydroxyanthraquinone is prepared exactly as in Example 1. Before passing in air, however, 0.63 gram of ethanolamine are added and the solution refluxed an additional two hours after which air is passed into the solution and the anthraquinone dye compound obtained by evaporation of the solvent. If desired, the dye can be purified by dissolving in water and filtering.

EXAMPLE 4.—*Preparation of 1-sodium-β-sulfoethylamino-4-benzylaminoanthraquinone*

This compound is prepared exactly as the compound of Example 3 except that 1.1 grams of benzylamine are substituted for ethanolamine.

EXAMPLE 5.—*Preparation of 1-sodium-β-sulfoethylamino-4-methylaminoanthraquinone*

This compound is prepared exactly as the compound of Example 3 except that 1 gram of 33% aqueous methylamine solution is substituted for ethanolamine.

EXAMPLE 6.—*Preparation of 1-sodium-β-sulfoethylamino-4-butylaminoanthraquinone*

This compound is prepared following the directions of Example 3 except that a molecular equivalent amount of butylamine is substituted for the ethanolamine of Example 3.

EXAMPLE 7.—*Preparation of 1-β-sulfoethylamino-4-cyclohexylamino-5-hydroxyanthraquinone*

28.8 grams of leuco-1,4,5-trihydroxyanthraquinone are dissolved in 500 cc. of hot pyridine. 14.7 grams of sodium taurinate are then added and the reaction mixture refluxed for two hours. 10.8 grams of cyclohexylamine are added and refluxing is continued for an additional four hours. The leuco compound resulting is oxidized by passing air into the reaction mixture following which the dye compound formed can be obtained by concentrating the reaction mixture and cooling. The dye compound obtained colors organic derivatives of cellulose, natural silk and wool blue tints from an aqueous solution containing sodium chloride.

EXAMPLE 8.—*Preparation of 1-sodium-β-sulfoethylamino-4-(4'-amino) - phenylamino-5,8-dihydroxyanthraquinone*

14.7 grams of sodium taurinate are placed in 500 cc. of pyridine containing 27.4 grams of leuco-1,4,5,8 - tetrahydroxyanthraquinone and refluxed for two hours. 11.3 grams of phenylenediamine are then added and refluxing continued for an additional four hours. The resulting leuco compound is then converted to the desired blue anthraquinone derivative by oxidation with air. The dye compound obtained colors organic derivatives of cellulose, natural silk and wool blue shades.

The above compound can likewise be prepared by adding sodium taurinate and p-phenylenediamine initially to leuco-1,4,5,8-tetrahydroxyanthraquinone and refluxing in pyridine until reaction is complete.

4.3 grams of the dye compound of this example are boiled for one hour on an oil bath with 20 grams of ethylenechlorohydrin and 5 grams of sodium acetate. The reaction mixture is poured into water and the desired compound precipitated by the addition of sodium chloride after which it is filtered, washed and dried. The 1-sodium-β-sulfoethylamino-4(4'-β-hydroxyethylamino)-phenylamino - 5,8 - dihydroxyanthraquinone obtained colors silk, wool and cellulose acetate silk greenish blue shades.

EXAMPLE 9.—*Preparation of 1-sodium-β-sulfoethylamino-4-tetrahydrofurfurylaminoanthraquinone*

24 grams of leuco quinizarin, 15 grams of sodium taurinate and 11 grams of tetrahydrofurfurylamine are heated in an autoclave at 120° C. for ten hours. When cooled, the leuco dye compound formed is oxidized with sodium perborate. The desired dye compound may be salted out or recovered by evaporation. It colors cellulose acetate silk, wool and silk blue shades.

EXAMPLE 10.—*Preparation of 1-ammonium-Δ-sulfobutylamino -4- amino-5-(1,2,3,4-tetrahydronaphthyl)-amino-8-aminoanthraquinone*

31 grams of 1,5-diamino-4,8-dimethoxyanthraquinone are dissolved in pyridine and 14.8 grams of 1,2,3,4-tetrahydro-1-aminonaphthalene are added slowly at room temperature. 18 grams of Δ-aminobutane ammonium sulfonate dissolved in a minimum amount of water are then added and the reaction is completed by warming. The dye compound obtained colors cellulose acetate silk, wool and silk greenish blue shades.

EXAMPLE 11

32.6 grams of 1,5-diamino-4,8-dinitroanthraquinone are heated in quinoline with 12 grams of 4-methyl-2-aminothiazole until no further color change takes place and then 24 grams of

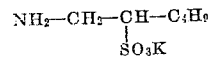

are added and the mixture is refluxed until no further color change takes place toward the green. The dye compound obtained colors cellulose acetate silk, wool and silk bluish green shades.

EXAMPLE 12

1 gram mole of

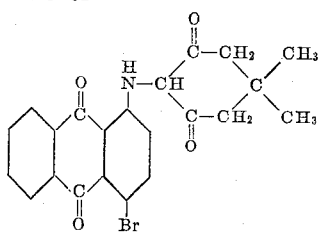

is heated in pyridine in the presence of a copper sulfate and copper catalyst with 2 gram moles of $H_2N-CH_2-CHOH-CH_2SO_3Na$ until no further color change takes place. The dye compound obtained colors cellulose acetate silk, wool and silk blue shades.

The anthraquinone starting material employed in this example can be prepared, for example, by heating 1 gram mole of 1-nitro-4-bromoanthraquinone on a water bath with 1 gram mole of 1-aminodimethyldihydroresorcinol in a pyridine reaction medium until no further color change towards the red takes place. Following this the reaction mixture is boiled for five minutes and then most of the pyridine is distilled off and the dye allowed to crystallize. The reaction product obtained can be purified by crystallization from acetic acid or nitrobenzene.

EXAMPLE 13

31.4 grams of 1-β-bromoethylamino-4-hydroxyanthraquinone are heated with 12 grams of sodium bisulfite in 300 cc. of water in an autoclave at 150° C. for 20 hours. Any unchanged bromo compound is separated by filtration. The 1 - sodium-β-sulfoethylamino-4-hydroxyanthraquinone dye obtained colors cellulose acetate silk, wool and silk purple shades.

52 grams of 1-γ-bromopropylamino-4-butylamino-5-phenylamino -8- aminoanthraquinone are heated in 500 cc. of butanol and 100 cc. of water with sodium bisulfite in an autoclave at about 150° C. for 20 hours. The resulting dye compound containing a γ-sulfopropylamino group in the 1-position colors cellulose acetate silk, wool and silk bluish green shades.

The preparation of the two dye compounds of this example illustrates the method indicated in Equation 7.

Using procedures similar to those described above, 1-ammonium-Δ-sulfobutylamino-4-(4'-β-hydroxyethylamino) - phenylaminoanthraquinone, 1-sodium-β-sulfoethylamino-4-bromoanthraquinone, 1-sodium-β-sulfoethylamino-4-sodium -γ- sulfopropylamino-5,8-dihydroxyanthraquinone and

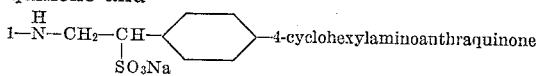

can be prepared. These compounds yield blue-green, rubine, greenish-blue and blue shades, respectively.

EXAMPLE 14

41 grams of 1-sodium-β-sulfatoethylamino-4-β-hydroxyethylaminoanthraquinone, 400 cc. of water and 25 grams of sodium sulfite are heated in an autoclave at 150–200° C. until the group in the 1-position is changed to a sodium-β-sulfoethylamino group. When cool, the reaction mixture is filtered and the dye recovered either by salting out or by concentration of the reaction mixture. The dye compound obtained colors cellulose acetate, wool and silk blue shades. The preparation of the dye compound described in this example illustrates the method indicated in Equation 1.

EXAMPLE 15

1 gram mole of

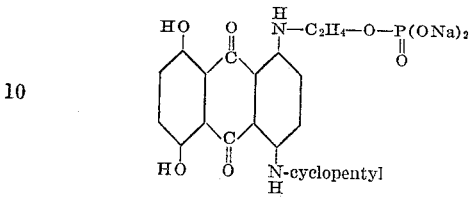

is dissolved in water and heated in an autoclave at 100–200° C. with 25 grams of sodium sulfite until the phosphoric acid ester group is converted to a sulfonic acid group. Upon completion of the reaction, the reaction mixture is allowed to cool whereupon it is filtered and the dye salted out of the filtrate or recovered by concentration of the filtrate. The dye compound obtained colors cellulose acetate silk, wool and silk greenish-blue shades.

The method of preparation described in this example illustrates that indicated by Equation 4.

EXAMPLE 16

1 gram mole of

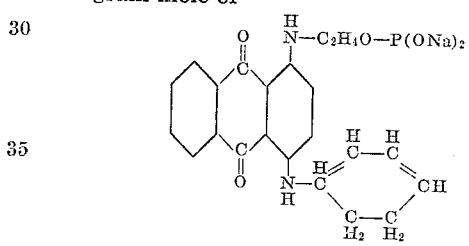

is dissolved in water and treated with sodium bisulfite in accordance with the procedure described in Examples 14 and 15. The dye compound obtained colors cellulose acetate silk, wool and silk blue shades.

The method described in this example illustrates that indicated in Equation 5.

In place of the inorganic acid ester groups shown in the starting anthraquinone compounds of Examples 14, 15 and 16, an inorganic acid group, having the general formula:

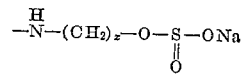

can be similarly employed; $x$ in this formula represents 1, 2, 3, 4, etc. The use of anthraquinone starting materials containing such an organic acid ester grouping illustrates the method indicated in Equation 6.

EXAMPLE 17

24 grams of 1,4-diaminoanthraquinone are heated in 200 cc. of water at 100–200° C. in an autoclave with 140 grams of vinyl sodium sulfonate until reaction is complete. When the reaction mixture is cooled, the unchanged diaminoanthraquinone compound is removed by filtration and the desired dye compound is recovered from the filtrate by salting or concentration. The dye compound obtained colors silk and wool purple shades.

30 grams of 1-amino-4-butylaminoanthraquinone can be similarly reacted with 170 grams of $C_2H_5CH=CH-SO_3Na$ to obtain

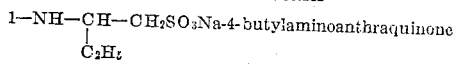

which colors cellulose acetate silk, wool and silk blue shades. Similarly 35 grams of leuco-1-phenylamino-4-amino-5,8-dihydroxyanthraquinone can be reacted with 170 grams of $$HOCH_2—CH=CH—SO_3NH_4$$

and the resulting leuco dye oxidized with sodium perborate to obtain 1-phenylamino-4-NH-CH-CH$_2$SO$_3$NH$_4$-5,8-dihydroxyanthraquinone
　　　　　　　　　｜
　　　　　　　　CH$_2$OH which yields greenish-blue shades on cellulose acetate silk, wool and silk.

The preparation of the dye compounds described in this example illustrate the method indicated by Equation 2.

EXAMPLE 18

24 grams of 1,4-diaminoanthraquinone are heated with 19 grams of carbyl sulfate at temperatures ranging from 20–150° C. The reaction time varies considerably depending upon the reaction temperature employed. Upon completion of the reaction, the reaction product is treated with ammonia water and filtered to remove any unchanged 1,4-diaminoanthraquinone. The resulting 1-ammonium-β-sulfoethylamino-4-aminoanthraquinone colors silk and wool purple shades.

EXAMPLE 19

30 grams of leuco-1-amino-4-butylaminoanthraquinone are heated in water with an excess of the sodium salt of ethionic acid $$—(HSO_3—C_2H_4—OSO_3Na)$$

at 100–200° C. for 20 hours. The leuco dye formed is oxidized with sodium perborate and worked up as described in Example 13. The dye compound obtained colors cellulose acetate silk, wool and silk blue shades. The preparation of this dye compound illustrates the method indicated in Equation 3.

If isoethionic acid be substituted for the ethionic acid of the example and the reaction carried out as described therein, a further dye compound included within the scope of our invention is obtained. This latter reaction illustrates that indicated by Equation 9.

EXAMPLE 20

32 grams of 1,4-diallylaminoanthraquinone are suspended in nitrobenzene and sulfur trioxide is passed into the mixture. The reaction product obtained is added to water and the nitrobenzene separated. A water soluble blue dye is obtained in which both of the allylamino groups contain both a sulfato and a sulfonic acid group. This dye colors silk and wool blue. Upon hydrolyzing the dye by boiling with water or an acid or alkali, H
1,4-di-N—CH$_2$—CH—CH$_2$ anthraquinone
　　　　　　　　｜　　｜
　　　　　　　OH　SO$_3$H is obtained.

The reaction described in this example illustrates that indicated in Equation 8. This reaction may be carried out employing an unsubstituted aliphatic amino group other than allylamino to obtain dye compounds of our invention. To illustrate, the reaction may be carried out with an anthraquinone compound containing a

H
—N—CH$_2$—CH=CHCH$_3$ group in an α-position.

The following tabulation further illustrates compounds of our invention together with the color they produce on cellulose acetate silk, wool and silk. The compounds designated below may be prepared in accordance with the methods hereinbefore described.

| | Dye | Color |
|---|---|---|
| 1 | 1-cetylamino-4-sodium-γ-sulfopropylamino anthraquinone | Blue. |
| 2 | 1-sodium-Δ-sulfobutylamino-4-5-dibutylamino-8-hydroxy anthraquinone | Greenish-blue. |
| 3 | 1-ammonium-Δ-sulfobutylamino-4-α-pyridinoamino anthraquinone | Blue. |
| 4 | 1-cyclohexylamino-4-sodium-γ-sulfopropylamino anthraquinone | Do. |
| 5 | 1-N-CH$_2$CHOHCH$_2$SO$_3$NH$_4$-4-cyclopentylamino-5,8-dihydroxyanthraquinone　H | Greenish-blue. |
| 6 | 1-sodium-β-sulfoethylamino-4-cycloheptylamino-5-butylamino anthraquinone | Bluish-green. |
| 7 | 1-sodium-β-sulfoethylamino-4-N-thiophene-　　　　　　　　　　　　　　　　H 5-β-hydroxyethylamino-8-hydroxy anthraquinone | Greenish-blue. |
| 8 | 1-N-carbazole-4-N(CH$_2$)$_{10}$SO$_3$Na anthraquinone　H　　　　　H | Blue. |

Both water-insoluble and water-soluble compounds are included within the scope of our invention and, accordingly, in employing them as dyes, the method of application will vary depending on whether a water-soluble or water-insoluble compound is involved. The water-insoluble dyes will ordinarily be applied to the material in the form of an aqueous suspension which can be prepared by grinding the dye to a paste in the presence of soap or other suitable dispersing agent and dispersing the resulting paste in water.

The water-soluble compounds of our invention do not require a solubilizing or dispersion treatment and may be added directly to an aqueous neutral dye bath and applied directly therefrom to the material undergoing coloration. If desired, common salt may be added to promote exhaustion of the dyebath.

Dyeing operations can be conducted at a temperature of 80–85° C., but any suitable temperature may be employed. In accordance with the usual dyeing practice, the material to be dyed will ordinarily be added to the dyebath at a temperature lower than that at which the main portion of the dyeing is to be effected, a temperature approximating 45–55° C. for example, following which the temperature of the dyebath will be raised to that selected for carrying out the dyeing operation. The temperature at which the dyeing is conducted will vary, depending, for example, on the particular material or materials undergoing coloration.

It will be understood that the anthraquinone compounds may be applied to the material to be colored in any suitable manner. Coloration may be effected, for example, by dyeing, printing or stenciling. Dispersing or solubilizing agents that can be employed for preparing suspensions of the insoluble dye compounds include soap, sulphoricinoleic acid, a salt of a sulphoricinoleic acid, and sulfonated oleic, stearic or palmitic acid, or salts thereof, such, for instance, as the sodium or ammonium salts.

The following example illustrates how dyeing may be carried out in accordance with our invention. Quantities are expressed in parts by weight.

EXAMPLE A 2.5 parts of the dye compound of Example 3 are added to 834 parts of water heated to 45–55° C. and 100 parts of cellulose acetate in the form of threads, fibers or fabric, for example, are entered and the temperature raised to 80–85° C. The cellulose acetate is worked at this temperature until dyeing is complete. The cellulose acetate is dyed a blue shade. By the addition of sodium chloride the depth of the dyeing can be controlled and exhaustion of the dyebath promoted. The water-insoluble compounds of our invention may, after being first subjected to a dispersing or solubilizing treatment, be employed in accordance with the dyeing operation described above or in any other suitable manner.

We claim:

1. The anthraquinone dye compounds which, in their free acid form, have the formula:

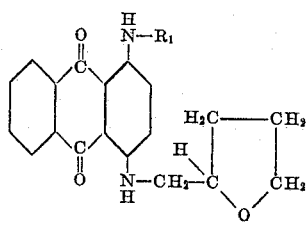

wherein $R_1$ represents an alkylene sulfonic acid group, other than methylene, joined to the nitrogen atom shown through a terminal carbon atom.

2. The anthraquinone dye compound which, in its free acid form, has the formula:

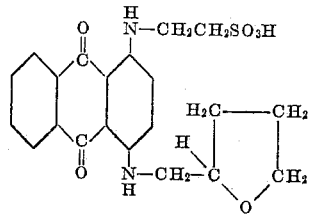

JAMES G. McNALLY.
JOSEPH B. DICKEY.